(12) United States Patent
Chen

(10) Patent No.: US 12,608,093 B2
(45) Date of Patent: Apr. 21, 2026

(54) VIRTUAL REALITY CONTROL METHOD FOR AVOIDING MOTION SICKNESS

(71) Applicant: Ying-Chi Chen, Taichung City (TW)

(72) Inventor: Ying-Chi Chen, Taichung City (TW)

( * ) Notice: Subject to any disclaimer, the term of this patent is extended or adjusted under 35 U.S.C. 154(b) by 421 days.

(21) Appl. No.: 18/025,943

(22) PCT Filed: Jun. 1, 2022

(86) PCT No.: PCT/CN2022/096531

§ 371 (c)(1),
(2) Date: Aug. 29, 2023

(87) PCT Pub. No.: WO2022/253258

PCT Pub. Date: Dec. 8, 2022

(65) Prior Publication Data

US 2025/0271947 A1      Aug. 28, 2025

(30) Foreign Application Priority Data

Jun. 2, 2021    (WO) ................ PCT/CN2021/097916

(51) Int. Cl.
G06F 3/0346 (2013.01)
G06F 3/01 (2006.01)

(52) U.S. Cl.
CPC ............ G06F 3/0346 (2013.01); G06F 3/012 (2013.01); G06F 3/015 (2013.01); G06F 3/017 (2013.01)

(58) Field of Classification Search
CPC ........ G06F 3/0346; G06F 3/012; G06F 3/015; G06F 3/017
See application file for complete search history.

(56) References Cited

U.S. PATENT DOCUMENTS

| | | | | |
|---|---|---|---|---|
| 10,692,489 B1 * | 6/2020 | Grizzel | ................... | G06F 3/167 |
| 10,890,976 B2 | 1/2021 | Welch | | |
| 11,995,774 B2 * | 5/2024 | Canberk | ................. | G06F 3/017 |
| 2014/0176296 A1 * | 6/2014 | Morgan | ................. | G06F 3/011 |
| | | | | 340/4.13 |
| 2017/0232343 A1 * | 8/2017 | Yoshioka | ............... | H04N 7/185 |
| | | | | 463/31 |
| 2017/0273552 A1 * | 9/2017 | Leung | .................... | A61B 3/005 |
| 2019/0018477 A1 * | 1/2019 | Fujiwara | ................. | G06F 3/012 |

(Continued)

FOREIGN PATENT DOCUMENTS

| | | |
|---|---|---|
| CN | 111033447 A | 4/2020 |
| JP | 2019-40555 A | 3/2019 |

(Continued)

*Primary Examiner* — Afroza Chowdhury
(74) *Attorney, Agent, or Firm* — Birch, Stewart, Kolasch & Birch, LLP

(57) ABSTRACT

A virtual reality (VR) control method is provided. In the method, a VR system detects a shaking direction of a head-mounted device of a VR user after receiving a displacement control instruction from the VR user, and then determines, according to an instruction matching rule, whether the displacement control instruction matches the shaking direction. If so, the VR system executes the displacement control instruction, and if not, the VR system does not execute the displacement control instruction. The virtual reality (VR) control method ensures that a head of the VR user has reacted in advance to stimulate a vestibular system of an inner ear before a VR scene changes, thereby avoiding motion sickness.

18 Claims, 12 Drawing Sheets

(56)             References Cited

U.S. PATENT DOCUMENTS

| 2019/0204909 | A1  | 7/2019  | Xiao |
| 2019/0362557 | A1  | 11/2019 | Lacey et al. |
| 2020/0055195 | A1* | 2/2020  | Ignakov ................... B25J 13/06 |
| 2020/0363865 | A1  | 11/2020 | Powderly et al. |
| 2021/0124412 | A1* | 4/2021  | Johnson ................ G06F 3/0346 |
| 2021/0407203 | A1* | 12/2021 | Canberk ............ G02B 27/0093 |
| 2023/0064707 | A1* | 3/2023  | Murakami ............. H04N 23/60 |

FOREIGN PATENT DOCUMENTS

| JP | 6688423 B1      | 4/2020  |
| JP | 6695004 B1      | 5/2020  |
| WO | WO 98/02223 A1  | 1/1998  |
| WO | WO 2022/252150 A1 | 12/2022 |

* cited by examiner

S10 — Receive a displacement control instruction from a VR user

S20 — Detect a shaking direction of a head of the VR user

S30 — Determine whether the displacement control instruction matches the shaking direction No → S40 — Skip executing the displacement control instruction Yes ↓

S50 — Execute the displacement control instruction

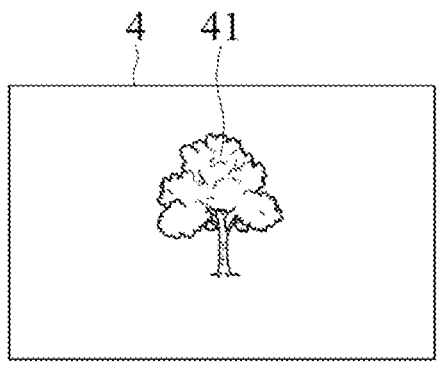
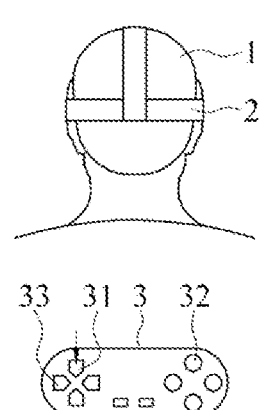
FIG. 2
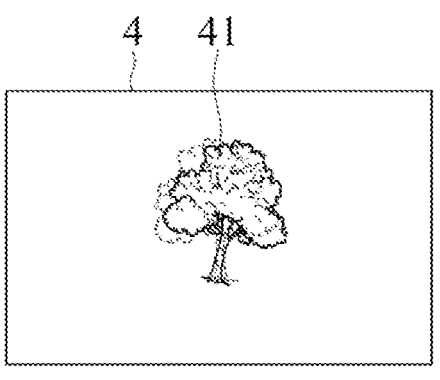
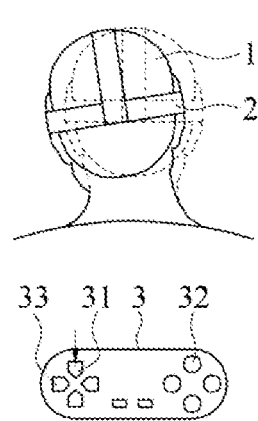
FIG. 3
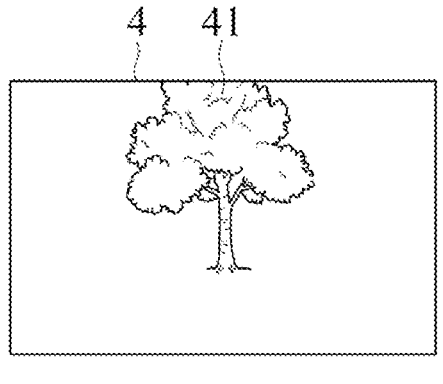
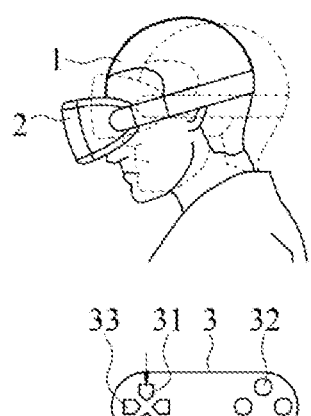
FIG. 4

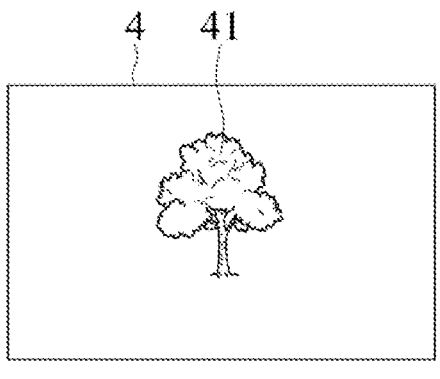
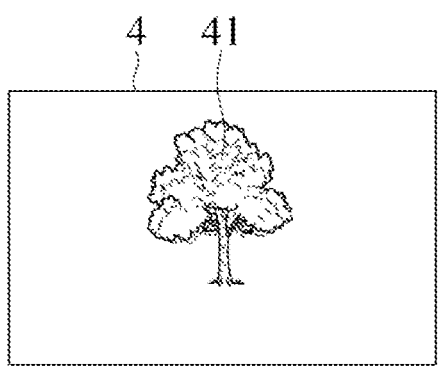
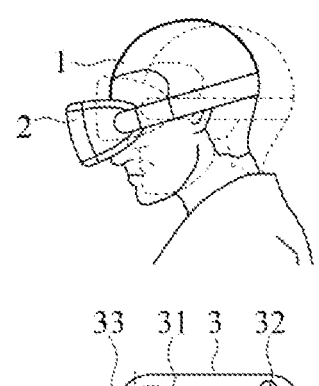
FIG. 5
FIG. 6
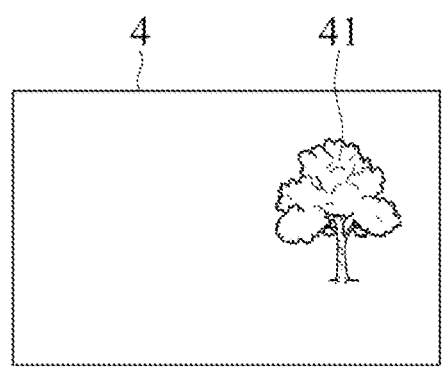
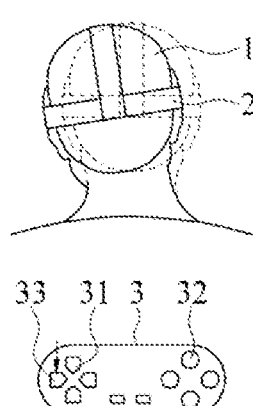
FIG. 7

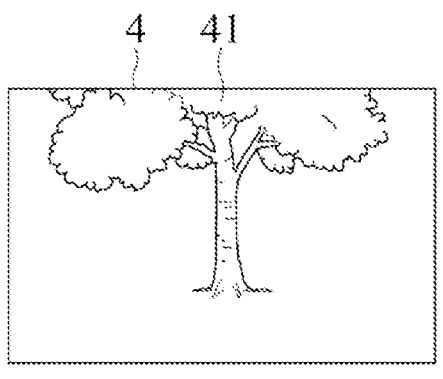
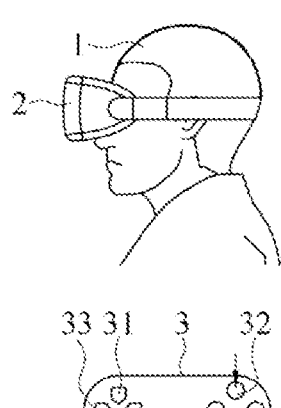
FIG. 8
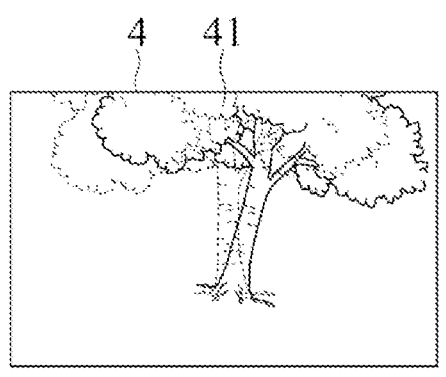
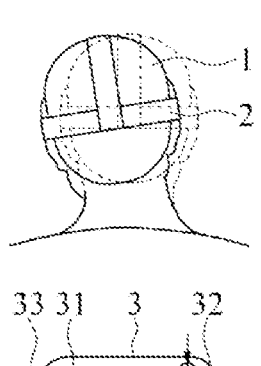
FIG. 9
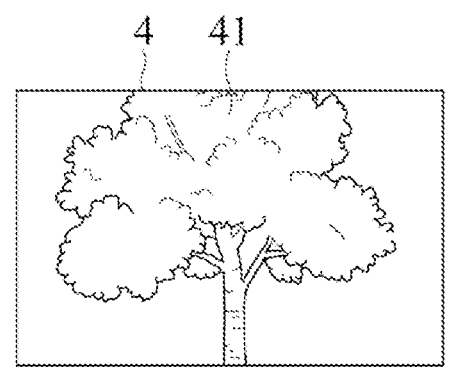
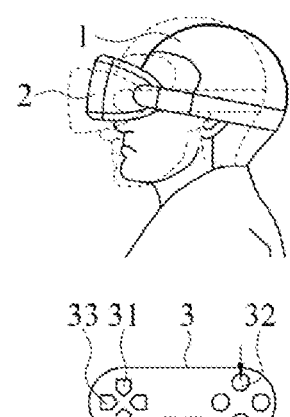
FIG. 10

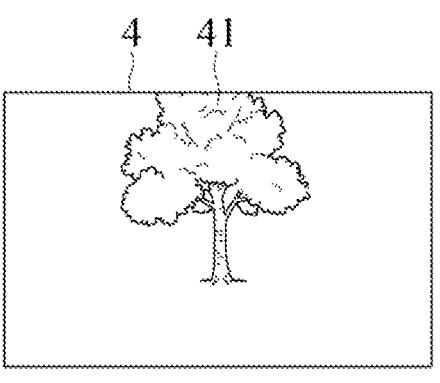
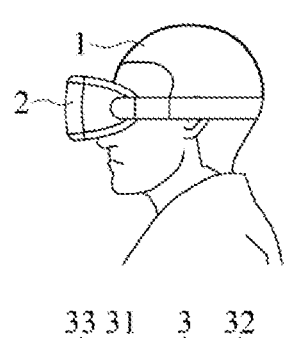
FIG. 11
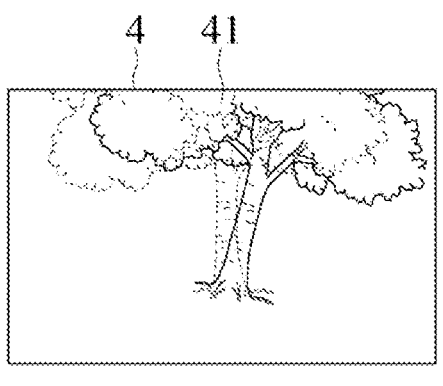
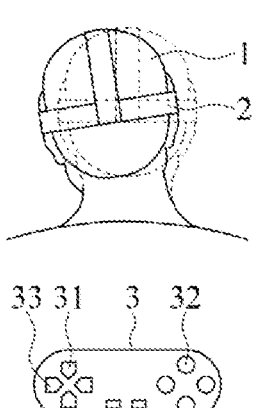
FIG. 12
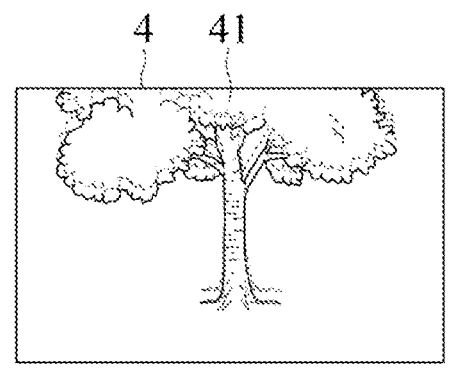
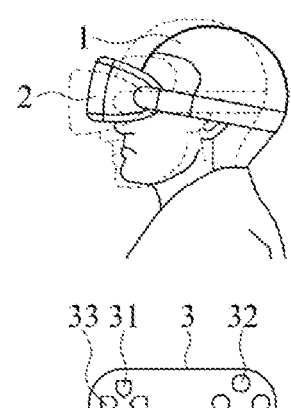
FIG. 13

50

Instruction matching table

| Movement operation | Displacement control instruction | Shaking direction |
|---|---|---|
| Move forward | Move forward | Forward (or backward) |
| Move backward | Move backward | Backward (or forward) |
| Move leftward | Move leftward | Leftward (or rightward) |
| Move rightward | Move rightward | Rightward (or leftward) |
| Jump/Move upward | Move upward | Upward (or downward) |
| Squat down/ Move downward | Move downward | Downward (or upward) |
| Stop | Stop | Backward (or forward) |

FIG. 14

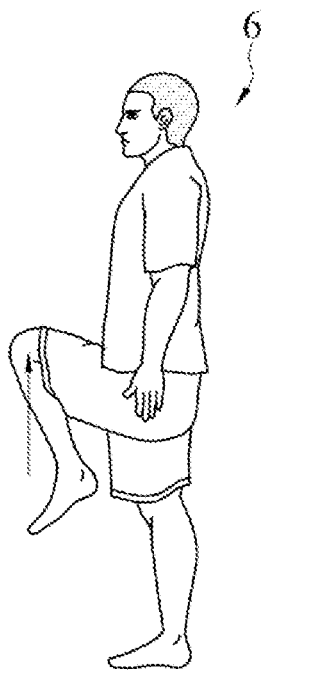
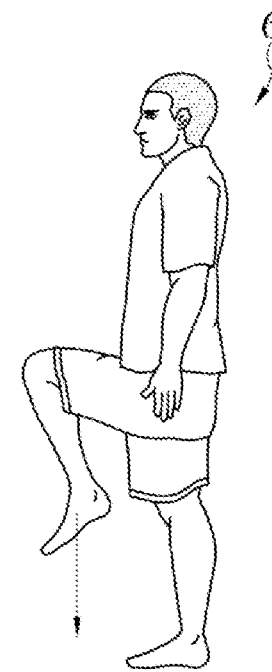
FIG. 16E                    FIG. 16F

VIRTUAL REALITY CONTROL METHOD FOR AVOIDING MOTION SICKNESS

CROSS REFERENCE TO RELATED APPLICATIONS

This application is the National Phase of PCT/CN2022/096531 filed on Jun. 1, 2022, which claims priority under 35 U.S.C. § 119 (a) to Patent Application No. PCT/CN2021/097916 filed on Jun. 2, 2021, all of which are hereby expressly incorporated by reference into the present application.

BACKGROUND

Technical Field

The present disclosure relates to a virtual reality (VR) control method for a VR user to perform a displacement operation in a VR world.

Related Art

Virtual Reality (VR for short below) is a three-dimensional virtual world generated by computer modules. As early as 1950 AD, some scholars put forward a similar concept. With the progress of science and technology, VR technology has gradually been carried forward in recent years, and 2016 is even referred to as the first year of VR.

Generally speaking, a VR user will experience the VR technology through a VR system. The VR system generally includes a head-mounted device and a controller, and some VR systems further include a somatosensory detection device configured to detect a limb movement of the VR operator. When experiencing the VR technology, the VR user will wear a head-mounted device to watch a VR scene in the VR world, and hold a controller in a hand to control movements of the VR user in the VR world.

The head-mounted device is equipped with a gyroscope and a gravity sensor (G-sensor) to detect the displacement of the head of the VR user. The controller may be a joystick, a remote controller, a keyboard, a mouse, a mobile phone, or any combination of the above controllers.

The so-called movement in the VR world is the movement of an object in a VR scene seen by the VR user through the head-mounted device. For example, if the VR user sends a "move forward" instruction through the controller, the object in the VR scene will gradually approach the VR user, and the VR user will feel that he/she is moving forward. If the VR user sends a "back" instruction through the controller, the object in the VR scene will gradually move away from the VR user, and the VR user will feel that he/she is moving backward.

The above principle produces the visual effect of a human body through the movement of the object in VR scene, so that the VR user feels that he/she is moving in the VR world.

Although the VR technology has gradually matured, some VR users may still have symptoms of motion sickness such as dizziness, nausea, fatigue, and giddiness when experiencing the VR technology. The reason is that when the movement felt by the human body is inconsistent with the visual picture, the determination of the body balance state and spatial orientation from the brain will have an error, and then the motion sickness is manifested.

In order to solve the above problems, some program developers use a control method such as pulling by hand, arm swinging, and pushing a hamster ball, so that the VR user moves slowly in the VR world to relieve the symptom of motion sickness. However, the speed in these movement methods is too slow, which is not in line with the way the VR user moves in the real world.

In addition, some program developers use a control mode of teleportation to allow the VR user to move in the VR world. Through an instant change of a picture, visual stimulation of the VR user can be reduced, thereby avoiding nausea. However, the above method is not in line with the way the VR user moves in the real world, which also reduces the immersion experience of the VR user.

Some other program developers adopt the method for a VR user to move in the VR world by vehicle, so that the VR user can feel that he/she is sitting in a car, on an animal, or in a spaceship to relieve vertigo. However, this control method still produces symptoms similar to carsickness or seasickness.

U.S. Pat. No. 10,890,976B2 discloses a VR platform with pressure control motion feedback. The VR platform senses an actual pressure movement direction of a VR user and transmits the direction information to a PC. The PC calculates and transmits a physical motion feedback to the platform, so that the platform moves or vibrates, and the VR user can have a more real experience in the VR world. Although the invention of U.S. Pat. No. 10,890,976B2 can reduce the impact of motion sickness, the invention is inconvenient to use. The VR user is required to stand on a gravity sensing device to operate, and a moving range of the VR user is also limited by the range of the gravity sensing device. The gravity sensing device further needs to occupy some space, which reduces a home space available to the user and reduces the popularity.

US2019/0204909A1 discloses a method for providing realistic and motion sickness resistance in the VR world. In the description, paragraphs 0018-0019 and 0024-0079 specifically disclose that in a VR system where a view and rotation are coupled, when a user rotates with the joystick/joystick button, the view displayed to the user also rotates, which may cause the user to have motion sickness. When the user navigates in the virtual world, a head HMD detection mechanism acquires the motion measurement in real time, and determines, through the acquired motion measurement, whether a motion of the user is intentional. When it is determined that the motion of the user is intentional, the measured motion is converted to a motion for VR in real time. However, the invention of US2019/0204909A1 only proposes a method of "how to capture a limb movement signal of a user through a plurality of motion sensors and perform analysis, so as to determine whether the limb movement of the user is intentional for a VR operation or merely a casual movement", so as to avoid a symptom of motion sickness. However, everybody has different limb movement habits, and this analysis method cannot accurately determine whether the movement of the user is intended to perform the VR operation.

SUMMARY

In view of this, the present invention is intended to provide a virtual reality (VR) control method. The method includes the following steps: receiving a displacement control instruction from a VR user, where the displacement control instruction is selected from a group consisting of moving forward, moving backward, moving leftward, moving rightward, stopping, moving upward, moving downward, and a combination thereof; detecting a shaking direction of a shake of a head of the VR user; and determining, according to an instruction matching rule, whether the displacement control instruction matches the shaking direction of the shake, where when the displacement control instruction matches the shaking direction of the shake, the displacement control instruction is executed, and when the displacement control instruction does not match the shaking direction of the shake, the displacement control instruction is not executed.

In some embodiments of the above VR control method, the step of detecting the shaking direction is performed within a preset time since the receipt of the displacement control instruction.

In some embodiments of the above VR control method, the step of executing the displacement control instruction is controlling an object in a VR scene to move in a direction in the displacement control instruction.

In some embodiments of the above VR control method, the step of executing the displacement control instruction is controlling an object in a VR scene to move in a direction opposite to the direction in the displacement control instruction.

In some embodiments of the above VR control method, the method further includes: determining whether a shaking displacement of the shake is greater than a displacement threshold, and determining, according to the instruction matching rule, whether the displacement control instruction matches the shaking direction of the shake when the shaking displacement of the shake is greater than the displacement threshold.

In some embodiments of the above VR control method, the method further includes: determining whether a shaking acceleration of the shake is greater than an acceleration threshold, and determining, according to the instruction matching rule, whether the displacement control instruction matches the shaking direction of the shake when the shaking acceleration of the shake is greater than the acceleration threshold.

In some embodiments of the above VR control method, when the shaking acceleration of the shake is greater than the acceleration threshold, a moving speed of a VR scene increases.

In some embodiments of the above VR control method, the method further includes: determining whether a shaking displacement of the shake is greater than a displacement threshold and determining whether a shaking acceleration of the shake is greater than an acceleration threshold, and determining, according to the instruction matching rule, whether the displacement control instruction matches the shaking direction of the shake when the shaking displacement of the shake is greater than a displacement threshold and the shaking acceleration of the shake is greater than the acceleration threshold.

In some embodiments of the above VR control method, a head-mounted device is configured to detect the shaking of the head of the VR user.

In some embodiments of the above VR control method, a somatosensory detection device is configured to detect the shaking of the head of the VR user.

In some embodiments of the above VR control method, the displacement control instruction is generated by the VR user by operating a controller.

In some embodiments of the above VR control method, the displacement control instruction is generated by a VR system by detecting a body motion of the VR user.

In some embodiments of the above VR control method, the body motion is selected from a group consisting of a hand motion, a foot motion, a body posture, and a combination thereof.

In some embodiments of the above VR control method, the displacement control instruction is generated by a VR system by detecting a brain wave signal of the VR user.

In some embodiments of the above VR control method, the displacement control instruction is generated by a VR system by detecting a voice instruction of the VR user.

In some embodiments of the above VR control method, the displacement control instruction is generated by a VR system by detecting a displacement trajectory of a marker held by the VR user.

In some embodiments of the above VR control method, the displacement control instruction is generated by a VR system by detecting a shape change of a marker held by the VR user.

Based on the above, one of the key technical means in the disclosure is to determine, according to an instruction matching rule, whether the displacement control instruction sent by the VR user matches the shaking direction of the shake of the head of the VR user. If the displacement control instruction matches the shaking direction, the displacement control instruction is executed, and if the displacement control instruction does not match the shaking direction, the displacement control instruction is not executed. The VR control method of the disclosure is combining a head shaking action configured to stimulate the vestibular system with an operation of the VR system based on a principle of the natural vestibular system of a human body, so as to perfectly achieve the effect of avoiding motion sickness.

BRIEF DESCRIPTION OF THE DRAWINGS

FIG. 2 is a schematic diagram (I) of a VR user moving forward in a VR world according to an embodiment of the present invention, where in this case, the VR user only presses a "forward" button and a head of the VR user does not shake, therefore a displacement control instruction does not match a shaking direction, and a VR system controls an object in a VR scene to maintain an original movement operation state.

FIG. 3 is a schematic diagram (II) of a VR user moving forward in a VR world according to an embodiment of the present invention, where in this case, a displacement control instruction does not match a shaking direction, and therefore a VR system only controls an object in a VR scene to swing, so that the VR user visually feels that he/she is shaking his/her head in the VR world.

FIG. 4 is a schematic diagram (III) of a VR user moving forward in a VR world according to an embodiment of the present invention, where in this case, a displacement control instruction matches a shaking direction, and a VR system controls an object in a VR scene to approach gradually.

FIG. 5 is a schematic diagram (I) of a VR user moving leftward in a VR world according to an embodiment of the present invention, where in this case, the VR user only presses a "leftward" button and a head of the VR user does not shake, therefore a displacement control instruction does not match a shaking direction, and a VR system controls an object in a VR scene to maintain an original movement operation state.

FIG. 6 is a schematic diagram (II) of a VR user moving leftward in a VR world according to an embodiment of the present invention, where in this case, a displacement control instruction does not match a shaking direction, and therefore a VR system only controls an object in a VR scene to swing, so that the VR user visually feels that he/she is shaking his/her head in the VR world.

FIG. 7 is a schematic diagram (III) of a VR user moving leftward in a VR world according to an embodiment of the present invention, where in this case, a displacement control instruction matches a shaking direction, and therefore a VR system controls an object in a VR scene to gradually move to the right, so that the VR user visually feels that he/she moves leftward in the VR world.

FIG. 8 is a schematic diagram (I) of a VR user jumping/ moving upward in a VR world according to an embodiment of the present invention, where in this case, the VR user only presses a "jump/move upward" button and a head of the VR user does not shake, therefore a displacement control instruction does not match a shaking direction, and a VR system controls an object in a VR scene to maintain an original movement operation state.

FIG. 9 is a schematic diagram (II) of a VR user jumping/ moving upward in a VR world according to an embodiment of the present invention, where in this case, a displacement control instruction does not match a shaking direction, and therefore a VR system only controls an object in a VR scene to swing, so that the VR user visually feels that he/she is shaking his/her head in the VR world.

FIG. 10 is a schematic diagram (III) of a VR user jumping/moving upward in a VR world according to an embodiment of the present invention, where in this case, a displacement control instruction matches a shaking direction, and a VR system controls an object in a VR scene to move down.

FIG. 11 is a schematic diagram (I) of a VR user stopping moving forward in a VR world according to an embodiment of the present invention, where in this case, the VR user only releases the pressed "forward" button and a head of the VR user does not shake, therefore a displacement control instruction does not match a shaking direction, and a VR system controls an object in a VR scene to maintain an original movement operation state.

FIG. 12 is a schematic diagram (II) of a VR user stopping moving forward in a VR world according to an embodiment of the present invention, where in this case, a displacement control instruction does not match a shaking direction, and therefore a VR system only controls an object in a VR scene to swing, so that the VR user visually feels that he/she is shaking his/her head in the VR world.

FIG. 13 is a schematic diagram (III) of a VR user stopping moving forward in a VR world according to an embodiment of the present invention, where in this case, a displacement control instruction matches a shaking direction, and a VR system controls an object in a VR scene to stop moving.

FIG. 14 is a schematic diagram of an instruction matching rule according to an embodiment of the present invention.

FIG. 16E is a schematic diagram (V) of a foot motion of a VR user according to an embodiment of the present invention.

FIG. 16F is a schematic diagram (VI) of a foot motion of a VR user according to an embodiment of the present invention.

REFERENCE NUMBERS OF THE DRAWINGS

Figure 1:
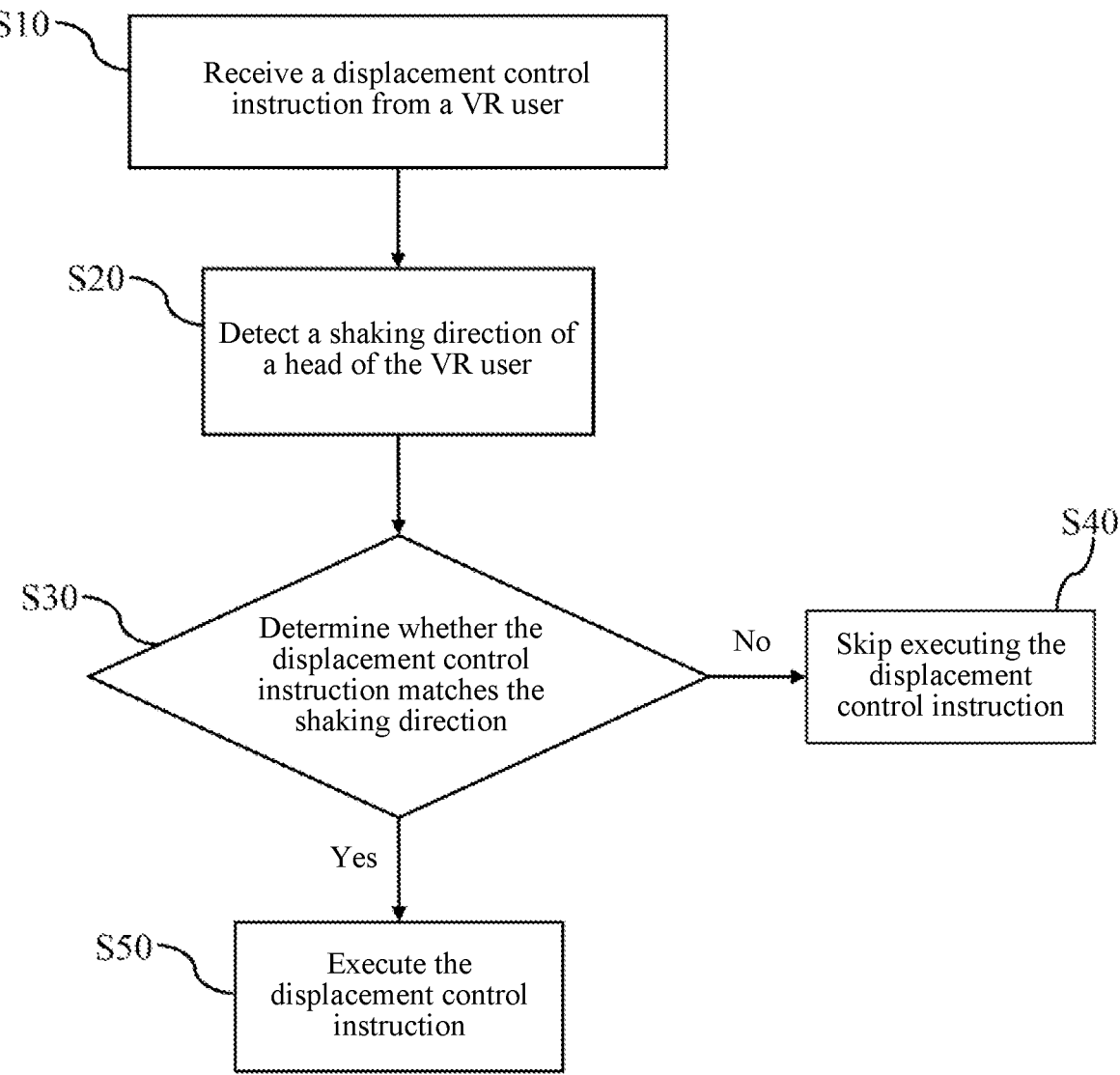
FIG. 1 is a flowchart of a virtual reality (VR) control method according to an embodiment of the present invention.

1: head
2: head-mounted device
3: controller
31: button
32: button
33: button
4: VR scene
41: object
50: instruction matching rule/instruction matching table
6: VR user
7: marker
S10-S50: steps

DETAILED DESCRIPTION

A structural principle and a working principle of the present invention are described below in detail with reference to the accompanying drawings.

A vestibular system is an important organ of balance perception in human body, which includes three semicircular canals (an outer semicircular canal, an upper semicircular canal, and a posterior semicircular canal) that can sense accelerations of the head in directions in a three-dimensional space. When the human body performs variable motions in all directions, the vestibular system is stimulated and provides information for the brain, so that the visual response of the human body can keep up with the actual movements. However, the vestibular system does not play a role when the human body performs a uniform motion.

For example, when we are riding a bicycle, we will feel a forward movement in an initial stage (that is, the variable motion). In this case, the vestibular system of the human body is stimulated by the variable motion, so that the human body can adapt to a visual picture movement. When we move forward at the same speed in the direction of inertia, although the vestibular system is no longer stimulated, the human body can still adapt to the visual picture movement without a symptom of motion sickness.

Referring to FIG. 1 to FIG. 4, FIG. 1 shows a flowchart of an exemplary virtual reality (VR) control method according to the present invention, and FIG. 2 to FIG. 4 respectively show schematic diagrams (I) to (III) of a VR user moving forward in a VR world. In this embodiment, the VR user executes a VR program through a VR system, where the VR system includes a head-mounted device 2 and a controller 3. The controller may be a joystick, a remote controller, a keyboard, a mouse, a pair of controllers (left/right), a touch pad, a displacement sensor equipped with a gyroscope and a gravity sensor or equipped with a camera that can detect a change of a space image and calculate displacement, a mobile phone, or any combination of the above controllers. A processor configured to execute the VR program may be directly arranged in the head-mounted device or additionally arranged in a computer host. When the processor configured to execute the VR program is additionally arranged in the computer host, the computer host is also regarded as a part of the VR system. The computer host may be a smart phone, a personal computer, a remote server, or a commercially available game host, such as a Nintendo Switch host, a Sony PS host, and a Microsoft Xbox host.

In some embodiments, a displacement control instruction is generated by the VR user by operating the controller 3. As shown in FIG. 2, the VR user holds the controller 3 in his/her hand, wears the head-mounted device 2 on his/her head 1, and sees a VR scene 4 with his/her eyes through the head-mounted device 2. The VR scene 4 includes an object 41. When the VR user presses a button 31 on the controller 3 to send a displacement control instruction of "move forward", the VR system does not execute the displacement control instruction when receiving the displacement control instruction of "move forward" at this time (step S10). That is to say, the VR user still stays in place in the VR world (in an original movement operation state). The original movement operation state means that when the VR user is in a static state before pressing the button 31 on the controller 3, the original movement operation state is the static state, and when the VR user is in a moving state before pressing the button 31 on the controller 3, for example, in a state of moving forward, the original movement operation state is a state of moving forward.

Then, the head-mounted device 2 detects a shaking direction of a head 1 of the VR user within a preset time after the VR user sends the displacement control instruction of "move forward" (step S20), and then the VR system determines, according to an instruction matching rule 50 (referred to as an instruction matching table 50 below) as shown in FIG. 14, whether the displacement control instruction matches the shaking direction (step S30). The preset time may be 1 second or less than 1 second. The instruction matching table 50 may be pre-stored in the head-mounted device 2 or the host computer, or loaded into the head-mounted device 2 or the host computer with the execution of the VR program. It is to be particularly noted that, in this embodiment, although the head-mounted device 2 is used to detect the shaking direction of the head 1 of the VR user, the shaking direction may also be detected by a somatosensory detection device. In addition, in some embodiments, the head-mounted device 2 may detect the shaking direction of the head 1 of the VR user within a duration during which the VR user sends the displacement control instruction of "move forward". The duration is a duration for which the VR user continuously presses the button 31 on the controller 3.

As shown in FIG. 3, when the user sends the displacement control instruction of "move forward" through the controller 3, but the shaking direction of the head 1 is leftward, the VR system provides a determination result of "unmatched" according to the instruction matching table 50, and therefore the VR system does not execute the displacement control instruction of "move forward" sent by the VR user (step S40), and controls only an object 41 in the VR scene 4 to swing to the right (equivalent to the head 1 of the VR user shaking leftward in the VR world).

As shown in FIG. 4, when the user sends the displacement control instruction of "move forward", but the head 1 shakes forward, the VR system provides a determination result of "matched" according to the instruction matching table 50, and therefore the VR system executes the displacement control instruction of "move forward" sent by the VR user (step S50), so as to control the object 41 in the VR scene 4 to gradually approach the VR user (equivalent to the VR user moving forward in the VR world).

In this embodiment, when the VR user simply sends the displacement control instruction through the controller 3, a corresponding change in the VR world cannot be directly caused. The VR system executes the displacement control instruction sent by the controller 3 and causes the VR scene 4 to make a change corresponding to the displacement control instruction only when the movement operation of the displacement control instruction matches the shaking direction of the head 1 of the VR user. In this way, it can be ensured that the head 1 of the VR user has reacted in advance to stimulate a vestibular system of an inner ear before the VR scene 4 changes, thereby avoiding motion sickness.

In some embodiments, the VR user can increase or decrease movement operations (for example, climbing, flying, lying down, tumbling, and so on) in the instruction matching table 50 according to requirements in different situations, and can customize a matching condition of each movement operation.

In some embodiments, the head-mounted device 2 not only detects the shaking direction of the head 1 of the VR user, but also further detects a shaking displacement of the head 1 of the VR user. The VR system determines, according to the instruction matching table 50, whether the displacement control instruction matches the shaking direction only when the shaking displacement is greater than a displacement threshold. The shaking displacement is a shaking amplitude of the head 1 of the VR user. A larger shaking amplitude of the head 1 of the VR user leads to a larger shaking displacement, and a smaller shaking amplitude of the head 1 of the VR user leads to a smaller shaking displacement. In some embodiments, the detection of the shaking displacement may also be realized by the somatosensory detection device.

The above displacement threshold functions to filter out slight shaking naturally generated by the human body. Even if a person deliberately keeps his/her limb still, some slight shakes may be still generated. The shaking displacements of these shakes may be filtered out as background noise to avoid causing erroneous determination of the VR system. In some embodiments, the displacement threshold may be a fixed value or may be customized by the VR user. In some embodiments, the displacement threshold may be adaptively adjusted by learning, in a way of machine learning, a degree to which a current VR user naturally and slightly shakes.

In some embodiments, the head-mounted device 2 not only detects the shaking direction of the head 1 of the VR user, but also further detects a shaking acceleration of the head 1 of the VR user. The VR system determines, according to the instruction matching table 50, whether the displacement control instruction matches the shaking direction only when the shaking acceleration is greater than an acceleration threshold. The shaking acceleration is a shaking speed variation of the head 1 of the VR user. A larger shaking speed variation of the head 1 of the VR user leads to a larger shaking acceleration, and a smaller shaking speed variation of the head 1 of the VR user leads to a smaller shaking acceleration. In some embodiments, the detection of the shaking acceleration may also be realized by the somatosensory detection device.

The above acceleration threshold also functions to filter out slight shaking naturally generated by the human body. Even if the person deliberately keeps his/her limb still, some slight shakes are still actually generated, but speeds of these shakes are not fast and have no obvious variation. By setting the acceleration threshold, unintentional shaking of the head 1 of the VR user may be regarded as background noise and filtered out, there avoiding the erroneous determination of the VR system.

In some embodiments, the above acceleration threshold also functions to assist the VR user in the movement operation in the VR world. That is to say, when the movement operation of the displacement control instruction sent by the VR user through the controller 3 matches the shaking direction of the head 1 of the VR user, the VR system may change the moving speed of the VR user in the VR world according to a signal of the shaking acceleration. The movement operation of "move forward" is used as an example. When the shaking acceleration is greater than the acceleration threshold, the VR system controls, to increase, the speed at which the object 41 in the VR scene 4 approaches the VR user (that is, the moving speed of the VR user in the VR world increases).

In some embodiments, the head-mounted device 2 of the VR system simultaneously detects the shaking displacement and the shaking acceleration of the head 1 of the VR user, and determines whether the shaking displacement and the shaking acceleration are respectively greater than the displacement threshold and the acceleration threshold. The VR system determines, according to the instruction matching table, whether the displacement control instruction matches the shaking direction only when the shaking displacement and the shaking acceleration are respectively greater than the displacement threshold and the acceleration threshold.

In addition to pressing the button 31, the above control mode of generating the displacement control instruction of "move forward" may also be pushing a rocker on the controller 3 "forward", rolling a roller "forward", sliding a touch panel "forward", or the controller 3 itself swinging "forward".

With the impact of human inertia, when the head 1 of the VR user shakes in one direction, the head 1 immediately shakes in a direction opposite to the direction to return to the original limb state. That is to say, the shaking of the head 1 is a reciprocating displacement motion. Therefore, the matching condition of the movement operation of "move forward" may be whether the head 1 of the VR user shakes "forward" or "backward".

Similarly, the above displacement operation of "move forward" may be applied to the displacement control instruction of "backward" by analogy.

As shown in FIG. 5, when the VR user presses a button 33 on the controller 3 to send a displacement control instruction of "move leftward", the VR system does not execute the displacement control instruction. That is to say, the VR user still stays in place in the VR world (in an original movement operation state). Then, the head-mounted device 2 detects the shaking direction of the head 1 of the VR user, and then the VR system determines, according to the instruction matching table 50 as shown in FIG. 14, whether the displacement control instruction matches the shaking direction.

As shown in FIG. 6, when the user sends the displacement control instruction of "move leftward" through the controller 3, but the shaking direction of the head 1 is forward, the VR system provides a determination result of "unmatched" according to the instruction matching table 50. Therefore, the VR system does not execute the displacement control instruction of "move leftward" sent by the VR user, and controls only the object 41 in the VR scene 4 to swing to the VR user (equivalent to the head 1 of the VR user shaking forward in the VR world).

As shown in FIG. 7, when the user sends the displacement control instruction of "move leftward", and the head 1 shakes leftward, the VR system provides a determination result of "matched" according to the instruction matching table 50. Therefore, the VR system executes the displacement control instruction of "move leftward" sent by the VR user, so as to control the object 41 in the VR scene 4 to gradually move to the right (equivalent to the VR user moving leftward in the VR world).

In addition to pressing the button 33, the above control mode of generating the displacement control instruction of "move leftward" may also be pushing the rocker on the controller "leftward", rolling a roller "leftward", sliding a touch panel "leftward", or the controller itself swinging "leftward".

With the impact of human inertia, when the head 1 of the VR user shakes in one direction, the head 1 immediately shakes in a direction opposite to the direction to return to the original limb state. That is to say, the shaking of a human head is a reciprocating displacement motion. Therefore, the matching condition of the movement operation of "move leftward" may be whether the head 1 of the VR user shakes "leftward" or "rightward".

Similarly, the above control mode of "move leftward" may also be applied to the control mode of "move rightward" by analogy.

As shown in FIG. 8, when the VR user presses a button 32 on the controller 3 to generate a displacement control instruction of "jump/move upward", the VR system does not execute the displacement control instruction. That is to say, the VR user still stays in place in the VR world (or in an original movement operation state). Then, the head-mounted device 2 detects the shaking direction of the head 1 of the VR user, and then the VR system determines, according to the instruction matching table 50 as shown in FIG. 14, whether the displacement control instruction matches the shaking direction.

As shown in FIG. 9, when the user sends the displacement control instruction of "jump/move upward" through the controller 3, but the head 1 shakes leftward, the VR system provides a determination result of "unmatched" according to the instruction matching table 50. Therefore, the VR system does not execute the displacement control instruction of "jump/move upward" sent by the VR user, and controls only the object 41 in the VR scene 4 to swing to the right (equivalent to the head 1 of the VR user shaking leftward in the VR world).

As shown in FIG. 10, when the user sends the displacement control instruction of "jump/move upward", and the head 1 shakes upward, the VR system provides a determination result of "matched" according to the instruction matching table 50. Therefore, the VR system executes the displacement control instruction of "jump/move upward" sent by the VR user, so as to control the object 41 in the VR scene 4 to move downward (equivalent to the VR user jumping or moving upward in the VR world). With the impact of human inertia, when the head 1 of the VR user shakes in one direction, the human head immediately shakes in a direction opposite to the direction to return to the original limb state. That is to say, the shaking of a human head is a reciprocating displacement motion. Therefore, the matching condition of the movement operation of "jump" may be whether the head 1 of the VR user shakes "upward" or "downward".

Similarly, the above control mode of "jump/move upward" may also be applied to the control mode of "squat down/move downward" by analogy.

As shown in FIG. 11, when the VR user releases the pressed button 31 on the controller 3 to send a displacement control instruction of "stop" in the state where the VR user continuously moves forward, the VR user will continue to move forward in the VR world (in the original movement operation state). Then, the head-mounted device 2 detects the shaking direction of the head 1 of the VR user, and then the VR system determines, according to the instruction matching table 50 as shown in FIG. 14, whether the displacement control instruction matches the shaking direction.

As shown in FIG. 12, when the user sends the displacement control instruction of "stop" via the controller 3 in the state of continuously moving forward, but the head 1 shakes leftward, the VR system provides a determination result of "unmatched" according to the instruction matching table 50. Therefore, the VR system does not execute the displacement control instruction of "stop" sent by the VR user, and continuously moves forward, so as to cause the object 41 in the VR scene 4 to continuously approach. In this case, the VR system only controls the object 41 in the VR scene 4 to swing to the right (equivalent to the head 1 of the VR user shaking leftward in the VR world).

As shown in FIG. 13, when the user sends the displacement control instruction of "stop" via the controller 3 in the state of continuously moving forward, but the head 1 shakes "backward" or "forward", the VR system provides a determination result of "matched" according to the instruction matching table 50. Therefore, the VR system does not execute the displacement control instruction of "stop" sent by the VR user, and continuously moves forward, so as to cause the object 41 in the VR scene 4 to continuously approach.

In addition to releasing the pressed button 31, the above control mode of generating the displacement control instruction of "stop" may also be "releasing" the rocker on the controller 3, "stopping" rolling a roller, "stop" sliding a touch panel, the controller 3 itself "stopping" swinging, or the controller 3 itself returning to a stop position preset by the VR program (for example, returning to a horizontal state relative to a horizontal plane from an inclined state relative to the horizontal plane).

The above control mode of generating the displacement control instruction of "stop" may also be pressing a "backward" button on the controller 3, pushing the rocker "backward", rolling the roller "backward", sliding the touch panel "backward", or the controller 3 itself swinging "backward".

In some embodiments, for example, when the VR scene is any one of boating, skiing, rocket control, or other mobile operations applying a reaction force, the displacement operation of the VR user swinging the controller 3 backward corresponds to the displacement control instruction of "move forward", but this is only a special variation of the above embodiment. The control may still be achieved through the original instruction matching table 50 or by designing another instruction matching table that conforms to the special situation operation. For example, when the VR scene is a skiing situation (the instruction matching table at this time is set for the skiing situation), the VR user moves through a pair of controllers (left/right). If the VR user wants to turn left, he/she slides the right controller backward to generate the displacement control instruction of "move leftward" to match the shaking direction ("leftward" or "rightward") of the head 1 of the VR user. This operation not only can simulate an action during actual skiing, but also can achieve the effect of avoiding motion sickness of the VR user.

In some embodiments, the displacement control instruction is generated by the VR system by detecting a body motion of the VR user 6. The VR system detects, through a camera, the body motion generated by the VR user 6, and then generates the corresponding displacement control instruction according to the body motion. It should be noted that VR user 6 may customize displacement control instructions respectively corresponding to different body motions, and therefore the same displacement control instruction may be generated by different body motions. In some embodiments, the body motion is selected from a group consisting of a hand motion, a foot motion, a body posture, and a combination thereof. The displacement control instructions respectively corresponding to different body motions are to be described by using a plurality of embodiments below.

Figure 15A:
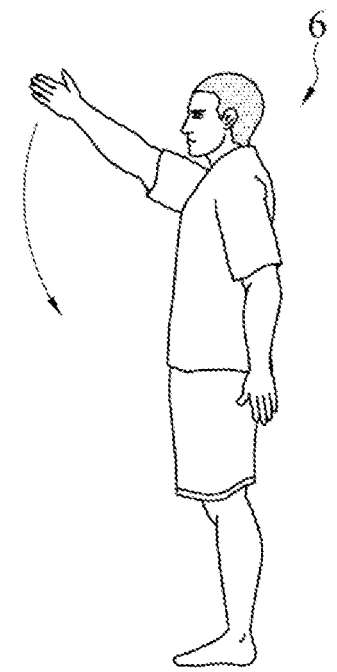
FIG. 15A is a schematic diagram (I) of a hand motion of a VR user according to an embodiment of the present invention.
Figure 15B:
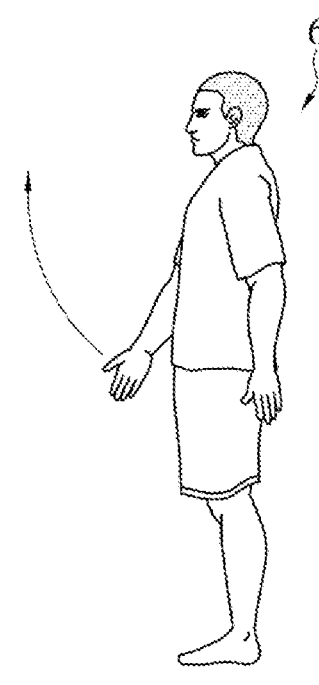
FIG. 15B is a schematic diagram (II) of a hand motion of a VR user according to an embodiment of the present invention.
Figure 15C:
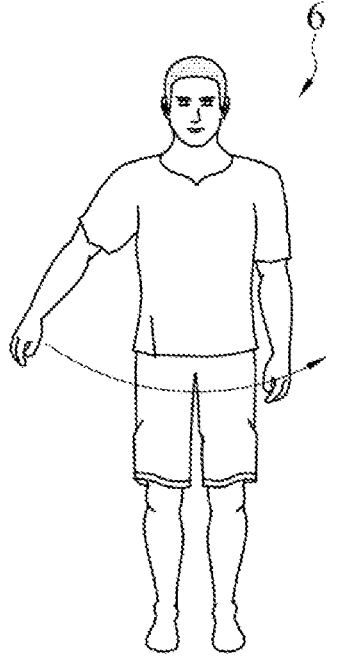
FIG. 15C is a schematic diagram (III) of a hand motion of a VR user according to an embodiment of the present invention.
Figure 15D:
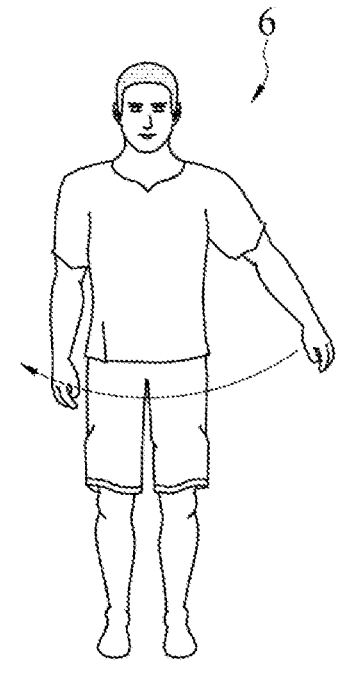
FIG. 15D is a schematic diagram (IV) of a hand motion of a VR user according to an embodiment of the present invention.
Figure 15E:
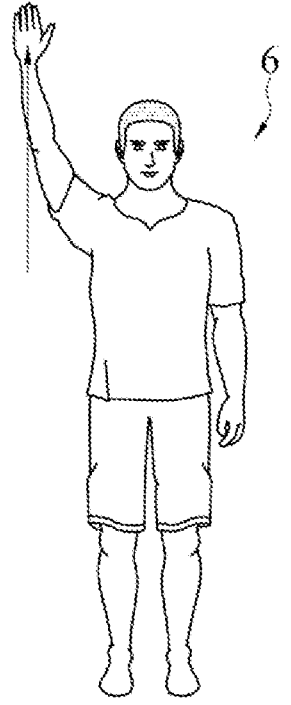
FIG. 15E is a schematic diagram (V) of a hand motion of a VR user according to an embodiment of the present invention.
Figure 15F:
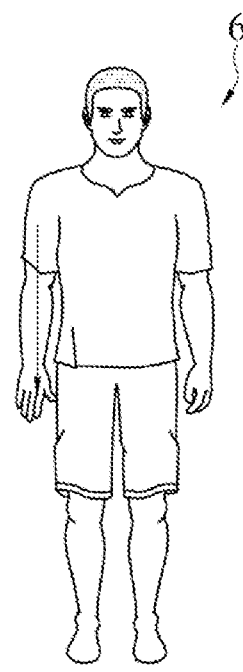
FIG. 15F is a schematic diagram (VI) of a hand motion of a VR user according to an embodiment of the present invention.

Referring to FIG. 15A to FIG. 15F, FIG. 15A to FIG. 15F illustrate schematic diagrams of hand motions of the VR user 6 in different embodiments. As shown in FIG. 15A, when an arm of the VR user 6 swings from top to bottom, the VR system detects a movement trajectory of the arm of the VR user 6 by image analysis or optical induction, and analyzes the movement trajectory of the arm by using an algorithm to generate a displacement control instruction of "move forward". Similarly, as shown in FIG. 15B, when the arm of the VR user 6 swings from bottom to top, the VR system generates a displacement control instruction of "move backward" or "stop". As shown in FIG. 15C, when the arm of the VR user 6 swings from right to left, the VR system generates a displacement control instruction of "move leftward". As shown in FIG. 15D, when the arm of the VR user 6 swings from left to right, the VR system generates a displacement control instruction of "move rightward". As shown in FIG. 15E, when the arm of the VR user 6 extends from bottom to top, the VR system generates a displacement control instruction of "move upward". As shown in FIG. 15F, when the arm of the VR user 6 extends from top to bottom, the VR system generates a displacement control instruction of "move downward".

In some embodiments, the VR system detects a finger movement trajectory of the VR user 6 by image analysis or optical induction, and analyzes the finger movement trajectory by using an algorithm to generate various displacement control instructions. In some embodiments, the VR system detects a shape change of a finger of the VR user 6 by image analysis, and generates various displacement control instructions. In some other embodiments, the VR system detects a palm/finger movement trajectory of the VR user 6 by image analysis, corresponds the palm/finger movement trajectory to position movement of a palm/finger of the VR user in VR world, and then analyzes how the position movement of the palm/finger in VR world pushes/presses a forward lever/button of a virtual controller in VR world, thereby generating a displacement control instruction of "move forward". Similarly, the VR system may also detect the palm/finger trajectory of the VR user 6 by image analysis to generate the displacement control instruction of "backward" or "stop", "leftward" or "rightward", "upward" or "downward".

Figure 16A:
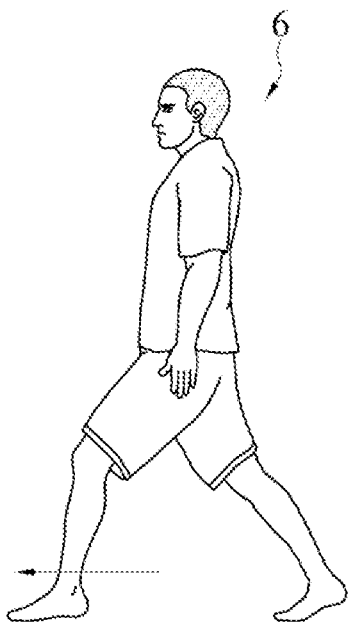
FIG. 16A is a schematic diagram (I) of a foot motion of a VR user according to an embodiment of the present invention.
Figure 16B:
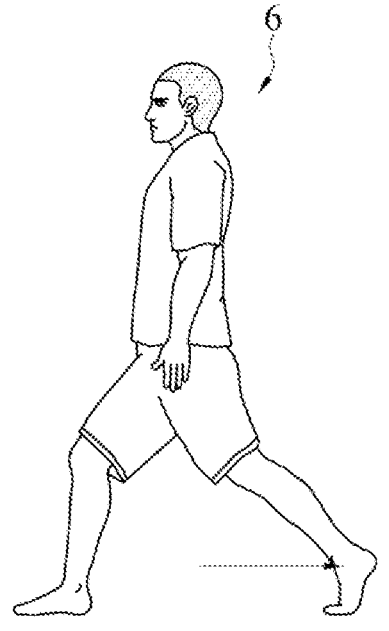
FIG. 16B is a schematic diagram (II) of a foot motion of a VR user according to an embodiment of the present invention.
Figure 16C:
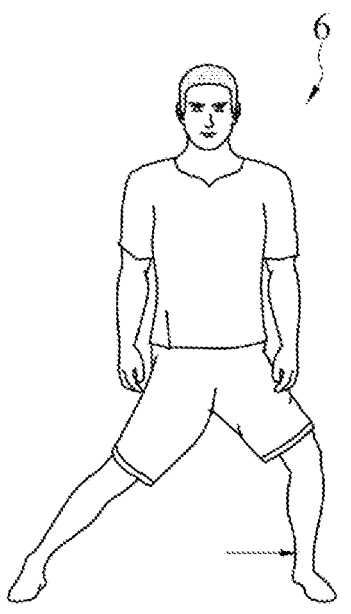
FIG. 16C is a schematic diagram (III) of a foot motion of a VR user according to an embodiment of the present invention.
Figure 16D:
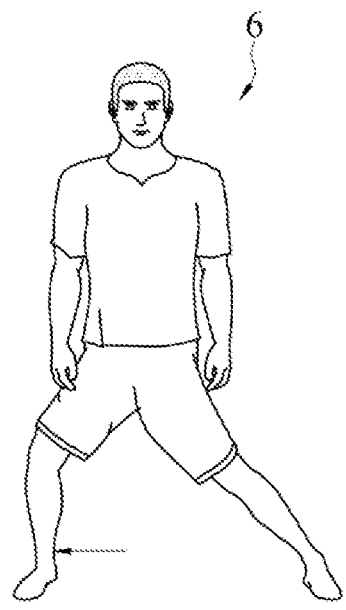
FIG. 16D is a schematic diagram (IV) of a foot motion of a VR user according to an embodiment of the present invention.

Referring to FIG. 16A to FIG. 16F, FIG. 16A to FIG. 16F illustrate schematic diagrams of foot motions of the VR user 6 in different embodiments. As shown in FIG. 16A, when a foot of the VR user 6 steps forward, the VR system detects a movement trajectory of the foot of the VR user 6 by image analysis or optical induction, and analyzes the movement trajectory of the foot by using an algorithm to generate a displacement control instruction of "move forward". Similarly, as shown in FIG. 16B, when the foot of the VR user 6 steps backward, the VR system generates a displacement control instruction of "move backward" or "stop". As shown in FIG. 16C, when the foot of the VR user 6 steps leftward, the VR system generates a displacement control instruction of "move leftward". As shown in FIG. 16D, when the foot of the VR user 6 steps to the right, the VR system generates a displacement control instruction of "move rightward". As shown in FIG. 16E, when the foot of the VR user 6 is lifted upward, the VR system generates a displacement control instruction of "move upward". As shown in FIG. 16F, when the foot of the VR user 6 paces downward, the VR system generates a displacement control instruction of "move downward".

In some embodiments, the displacement control instruction is generated by the VR system by detecting a brain wave signal of the VR user 6. The VR system detects and analyzes the brain wave signal of the VR user 6 through a brain computer interface (BCI), and then generates the corresponding displacement control instruction according to the brain wave signal. For example, when the VR user 6 thinks about "move forward" and sends a corresponding brain wave, the VR system generates a displacement control instruction of "move forward" according to the brain wave. When the VR user 6 thinks about "move backward" and sends a corresponding brain wave, the VR system generates a displacement control instruction of "move backward" according to the brain wave. When the VR user 6 thinks about "move leftward" and sends a corresponding brain wave, the VR system generates a displacement control instruction of "move leftward" according to the brain wave. When the VR user 6 thinks about "move rightward" and sends a corresponding brain wave, the VR system generates a displacement control instruction of "move rightward" according to the brain wave. When the VR user 6 thinks about "stop" and sends a corresponding brain wave, the VR system generates a displacement control instruction of "stop" according to the brain wave. When the VR user 6 thinks about "move upward" and sends a corresponding brain wave, the VR system generates a displacement control instruction of "move upward" according to the brain wave. When the VR user 6 thinks about "move downward" and sends a corresponding brain wave, the VR system generates a displacement control instruction of "move downward" according to the brain wave.

In some embodiments, the displacement control instruction is generated by the VR system by detecting a voice signal of the VR user 6. The VR system receives, through a microphone, the voice signal sent by the VR user 6, and then generates the corresponding displacement control instruction according to the voice signal. For example, when the VR user 6 says "move forward", the VR system generates a displacement control instruction of "move forward" according to the voice. When the VR user 6 says "move backward", the VR system generates a displacement control instruction of "move backward" according to the voice. When the VR user 6 says "move leftward", the VR system generates a displacement control instruction of "move leftward" according to the voice. When the VR user 6 says "move rightward", the VR system generates a displacement control instruction of "move rightward" according to the voice. When the VR user 6 says "stop", the VR system generates a displacement control instruction of "stop" according to the voice. When the VR user 6 says "move up", the VR system generates a displacement control instruction of "move upward" according to the voice. When the VR user 6 says "move downward", the VR system generates a displacement control instruction of "move downward" according to the voice.

Figure 17A:
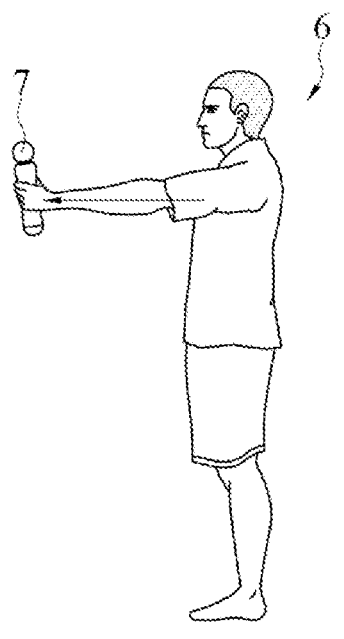
FIG. 17A is a schematic diagram (I) of a displacement trajectory of a marker held by a VR user according to an embodiment of the present invention.
Figure 17B:
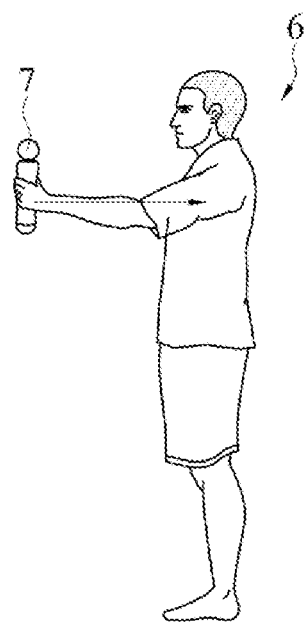
FIG. 17B is a schematic diagram (II) of a displacement trajectory of a marker held by a VR user according to an embodiment of the present invention.
Figure 17C:
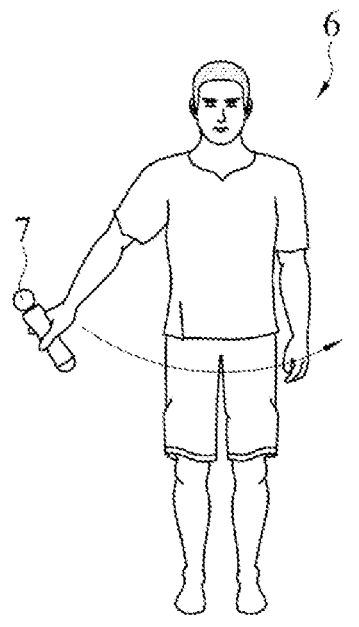
FIG. 17C is a schematic diagram (III) of a displacement trajectory of a marker held by a VR user according to an embodiment of the present invention.
Figure 17D:
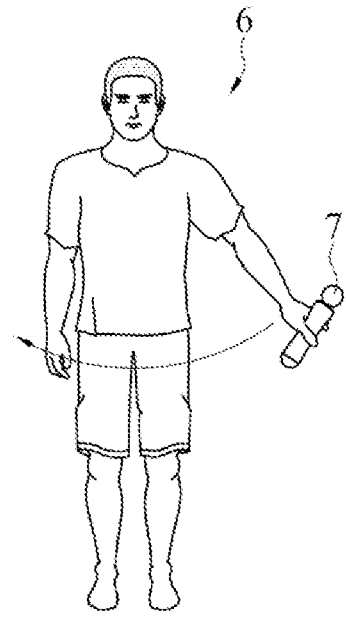
FIG. 17D is a schematic diagram (IV) of a displacement trajectory of a marker held by a VR user according to an embodiment of the present invention.
Figure 17E:
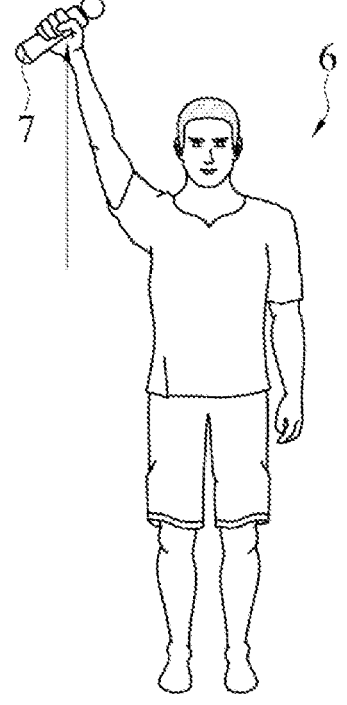
FIG. 17E is a schematic diagram (V) of a displacement trajectory of a marker held by a VR user according to an embodiment of the present invention.
Figure 17F:
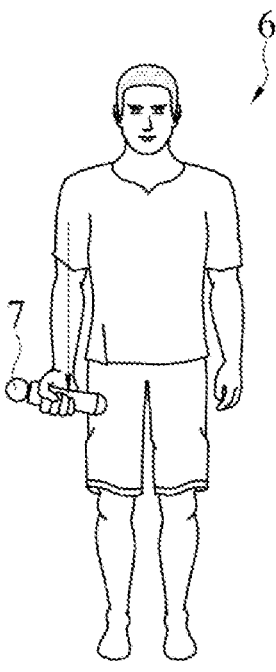
FIG. 17F is a schematic diagram (VI) of a displacement trajectory of a marker held by a VR user according to an embodiment of the present invention.

Referring to FIG. 17A to FIG. 17F, FIG. 17A to FIG. 17F illustrate schematic diagrams of displacement trajectories of a marker 7 held by the VR user 6 in different embodiments. In some embodiments, the displacement control instruction is generated by a VR system by detecting the displacement trajectory of the marker 7 held by the VR user 6 by image analysis or optical induction. The image analysis is used as an example. The VR system may detect the displacement trajectory of the marker 7 through a camera, and then generate the corresponding displacement control instruction according to the displacement trajectory of the marker 7. As shown in FIG. 17A, when the marker 7 moves from back to front, the VR system detects the displacement trajectory of the marker 7, and analyzes the detected displacement trajectory of the marker 7 by using an algorithm to generate a displacement control instruction of "move forward". Similarly, as shown in FIG. 17B, when the VR system detects that the displacement trajectory of the marker 7 is from front to back, the VR system generates a displacement control instruction of "move backward" or "stop". As shown in FIG. 17C, when the VR system detects that the displacement trajectory of the marker 7 is from right to left, the VR system generates a displacement control instruction of "move leftward". As shown in FIG. 17D, when the VR system detects that the displacement trajectory of the marker 7 is from left to right, the VR system generates a displacement control instruction of "move rightward". As shown in FIG. 17E, when the VR system detects that the displacement trajectory of the marker 7 is from bottom to top, the VR system generates a displacement control instruction of "move upward". As shown in FIG. 17F, when the VR system detects that the displacement trajectory of the marker 7 is from top to bottom, the VR system generates a displacement control instruction of "move downward".

In some embodiments, the displacement control instruction is generated by the VR system by detecting the shape of the marker 7 held by the VR user 6, and then the corresponding displacement control instruction is generated according to the shape change or a deformation degree of the marker 7. For example, when the VR user 6 holds a marker 7 with a variable shape (such as a commercially available fitness ring), the VR system detects the shape change or deformation degree of the marker 7 by image analysis or optical induction, and analyzes the detected shape change or deformation degree of the marker 7 by using an algorithm to generate displacement control instructions such as "move forward", "move backward", "stop", "move leftward", "move rightward", "move upward", and "move downward".

Certainly, the present invention may further have a plurality of other embodiments. A person skilled in the art may make various corresponding changes and variations according to the present invention without departing from the spirit and essence of the present invention. However, such corresponding changes and variations shall fall within the protection scope of the claims appended to the present invention.

What is claimed is:

1. A virtual reality (VR) control method, comprising:
   receiving a displacement control instruction from a VR user, wherein the displacement control instruction is selected from a group consisting of moving forward, moving backward, moving leftward, moving rightward, stopping, moving upward, moving downward, and a combination thereof; wherein the displacement control instruction is associated with a movement of a VR scene;
   detecting a shaking direction of a shake of a head of the VR user; and
   determining, according to an instruction matching rule, whether a moving direction of the movement of the VR scene associated with the displacement control instruction matches the shaking direction of the shake, wherein
   when the moving direction of movement of the VR scene associated with the displacement control instruction matches the shaking direction of the shake, the displacement control instruction is executed, and when the moving direction of movement of the VR scene associated with the displacement control instruction does not match the shaking direction of the shake, the displacement control instruction is not executed.

2. The VR control method according to claim 1, wherein the step of detecting the shaking direction is performed within a preset time since the receipt of the displacement control instruction.

3. The VR control method according to claim 1, wherein the step of executing the displacement control instruction is controlling an object in a VR scene to move in a direction in the displacement control instruction.

4. The VR control method according to claim 1, wherein the step of executing the displacement control instruction is controlling an object in a VR scene to move in a direction opposite to a direction in the displacement control instruction.

5. The VR control method according to claim 1, further comprising:
   determining whether a shaking displacement of the shake is greater than a displacement threshold, and determining, according to the instruction matching rule, whether the displacement control instruction matches the shaking direction of the shake when the shaking displacement of the shake is greater than the displacement threshold.

6. The VR control method according to claim 1, further comprising:
   determining whether a shaking acceleration of the shake is greater than an acceleration threshold, and determining, according to the instruction matching rule, whether the displacement control instruction matches the shaking direction of the shake when the shaking acceleration of the shake is greater than the acceleration threshold.

7. The VR control method according to claim 6, wherein when the shaking acceleration of the shake is greater than the acceleration threshold, a moving speed of an object in a VR scene is increased.

8. The VR control method according to claim 1, further comprising:
   determining whether a shaking displacement of the shake is greater than a displacement threshold and determining whether a shaking acceleration of the shake is greater than an acceleration threshold, and determining, according to the instruction matching rule, whether the displacement control instruction matches the shaking direction of the shake when the shaking displacement of the shake is greater than the displacement threshold and the shaking acceleration of the shake is greater than the acceleration threshold.

9. The VR control method according to claim 1, wherein the shake of the head of the VR user is detected by a head-mounted device.

10. The VR control method according to claim 1, wherein the shake of the head of the VR user is detected by a somatosensory detection device.

11. The VR control method according to claim 1, wherein the step of detecting the shaking direction is performed within a duration since the receipt of the displacement control instruction.

12. The VR control method according to claim 1, wherein the displacement control instruction is generated by the VR user by operating a controller.

13. The VR control method according to claim 1, wherein the displacement control instruction is generated by a VR system by detecting a body motion of the VR user.

14. The VR control method according to claim 13, wherein the body motion is selected from a group consisting of a hand motion, a foot motion, a body posture, and a combination thereof.

15. The VR control method according to claim 1, wherein the displacement control instruction is generated by a VR system by detecting a brain wave signal of the VR user.

16. The VR control method according to claim 1, wherein the displacement control instruction is generated by a VR system by detecting a voice instruction of the VR user.

17. The VR control method according to claim 1, wherein the displacement control instruction is generated by a VR system by detecting a displacement trajectory of a marker held by the VR user.

18. The VR control method according to claim 1, wherein the displacement control instruction is generated by a VR system by detecting a shape of a marker held by the VR user.

* * * * *